United States Patent
Wang et al.

(10) Patent No.: US 6,300,723 B1
(45) Date of Patent: Oct. 9, 2001

(54) APPARATUS FOR POWER FACTOR CONTROL

(75) Inventors: Shenghong Wang, Yorktown Heights; Ihor T. Wacyk, Briarcliff Manor, both of NY (US); Demetri J. Giannopoulos, Norwalk, CT (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/652,937

(22) Filed: Aug. 31, 2000

Related U.S. Application Data

(63) Continuation of application No. 09/124,452, filed on Jul. 29, 1998, now Pat. No. 6,140,777.

(51) Int. Cl.$^7$ .................................................. H05B 41/16
(52) U.S. Cl. ......................... 315/247; 315/307; 315/291
(58) Field of Search ................................. 315/247, 307, 315/219, 297, 291, 224, 225, 209 R

(56) References Cited

U.S. PATENT DOCUMENTS

| | | | |
|---|---|---|---|
| 5,371,443 | * 12/1994 | Sun et al. | 315/247 |
| 5,619,289 | * 4/1997 | Katyl et al. | 315/224 |
| 5,650,694 | * 7/1997 | Jayaraman et al. | 315/225 |

* cited by examiner

*Primary Examiner*—Don Wong
*Assistant Examiner*—Tuyet T. Vo
(74) *Attorney, Agent, or Firm*—Edward Blocker; Bernard Branzblau

(57) ABSTRACT

An apparatus for power factor control includes a capacitor for producing a substantially DC voltage and a switch for controlling the amount of energy stored in the capacitor in response to a switching signal. The switching signal is produced by the power factor controller and is based on a sinusoidal waveform that is independent of the waveform of an AC supply voltage for energizing an electric load.

17 Claims, 1 Drawing Sheet

APPARATUS FOR POWER FACTOR CONTROL

CROSS REFERENCE TO RELATED APPLICATIONS

This is a continuation of application Ser. No. 09/124,452, filed Jul. 29, 1998 now U.S. Pat. No. 6,140,777.

BACKGROUND OF THE INVENTION

This invention relates to an apparatus for power factor control, for example, to a preconditioner of an electronic ballast and, more particularly, to a power factor controller of an electronic ballast preconditioner.

Power factor controllers control the ballast input current in response to the ballast input voltage in attempting to provide a ballast power factor of 1.0 (i.e. to make the ballast input look like a simple resistor). The ballast power factor is the ratio of the actual power of an alternating or pulsating current to the apparent power drawn by a ballast. When the input current relative to the input voltage contains phase displacement, harmonic distortion or both, the power factor will be less than 1.0. The amount of displacement between the voltage and current indicates the degree to which the load is reactive. Harmonic distortion, that is, the production of harmonic frequencies, arises from the nonlinear operation of the ballast in drawing power from a mains sinudoidal signal.

A conventional power factor controller often assumes that the input voltage to the ballast will be substantially sinusoidal. Non-linear loads (e.g. machines, motors) drawing power from the mains can temporarily distort the mains voltage resulting in a substantially nonsinusoidal input voltage. Control of the input current based on a non-sinsoidal input voltage can be difficult and can lead to power factor correction of far less than 1.0. It also can be difficult to maintain a total harmonic distortion (TBD) of less than 10% without adversely affecting the power factor.

Maintaining low THD while supplying a DC voltage to the ballast inverter with low ripple typically requires an undesirably large, expensive electrolytic capacitor. Such capacitors deteriorate with time (i.e. dry out) losing their capacitance and therefore their capability of maintaining low ripple. Unacceptable TED levels can result. The relatively large size of these electrolytic capacitors also hampers integrating the components of the ballast preconditioner onto an integrated circuit thereby limiting reduction in ballast manufacturing cost and size.

It is therefore desirable to provide an improved power factor controller which is unaffected by the temporary distortion of the mains voltage. The improved power factor controller should maintain a relatively high power factor (e.g. greater than 95%) without use of a relatively large electrolytic capacitor in order to maintain a low THD.

SUMMARY OF THE INVENTION

In accordance with a first aspect of the invention, a ballast preconditioner includes a capacitor for producing a substantially DC voltage, a switch for controlling the amount of energy stored in the capacitor in response to a switching signal; and a power factor controller for producing the switching signal. The power factor controller includes a reference waveform generator having a look-up table for storing values of at least one waveform. The switching signal produced by the power factor controller is based on the at least one waveform accessed from the look-up table.

The power factor controller is unaffected by temporary distortion of a mains voltage caused by non-linear loads such as machines through storage of the waveform in the look-up table. The waveform stored is typically a half cycle of a sine wave.

It is a feature of the invention that the preconditioner includes a scaling circuit for adjusting the size of the waveform accessed from the look-up table. The scaling circuit is responsive to the voltage across the output of the preconditioner in adjusting the size of the waveform accessed from the look-up table.

The preconditioner is powered by an AC signal at a first frequency. The reference waveform generator generally further includes a phase lock loop having a pulse output signal at a second frequency. This second frequency is a multiple of the first frequency. The pulse output signal, which serves as a clock signal for reading the values of the at least one waveform stored in the look-up table, is a series of pulses (pulse train). The beginning of the pulse train is synchronized to a substantially zero voltage condition of the AC signal. Consequently, any phase displacement between the input ballast voltage and the signal for turning on the switch is substantially eliminated. The power factor controller can include a microcontroller having a read-only memory serving as the look-up table.

In accordance with another aspect of the invention, a method for operating a ballast preconditioner includes generating a waveform based on values stored in a look-up table, producing a switching signal based on the generated waveform, controlling the amount of energy stored in a capacitor in response to the switching signal, and producing a substantially DC voltage across the capacitor based on the stored energy.

It is a feature of this second aspect of the invention that the method further include adjusting the size of the waveform generated based on the voltage across an output of the preconditioner.

Accordingly, it is an object of the invention to provide an improved ballast preconditioner having a power factor controller which is unaffected by the temporary distortion of the mains voltage.

It is another object of the invention to provide an improved ballast preconditioner having a power factor controller which maintains a relatively high power factor without the use of a relatively large electrolytic capacitor in order to maintain a low THD.

Still other objects and advantages of the invention will, in part, be obvious and will, in part, be apparent from the specification.

The invention accordingly comprises several steps in the relation of one or more such steps with respect to each of the others, and a device embodying features of construction, combination of elements, and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENT

Figure 1:
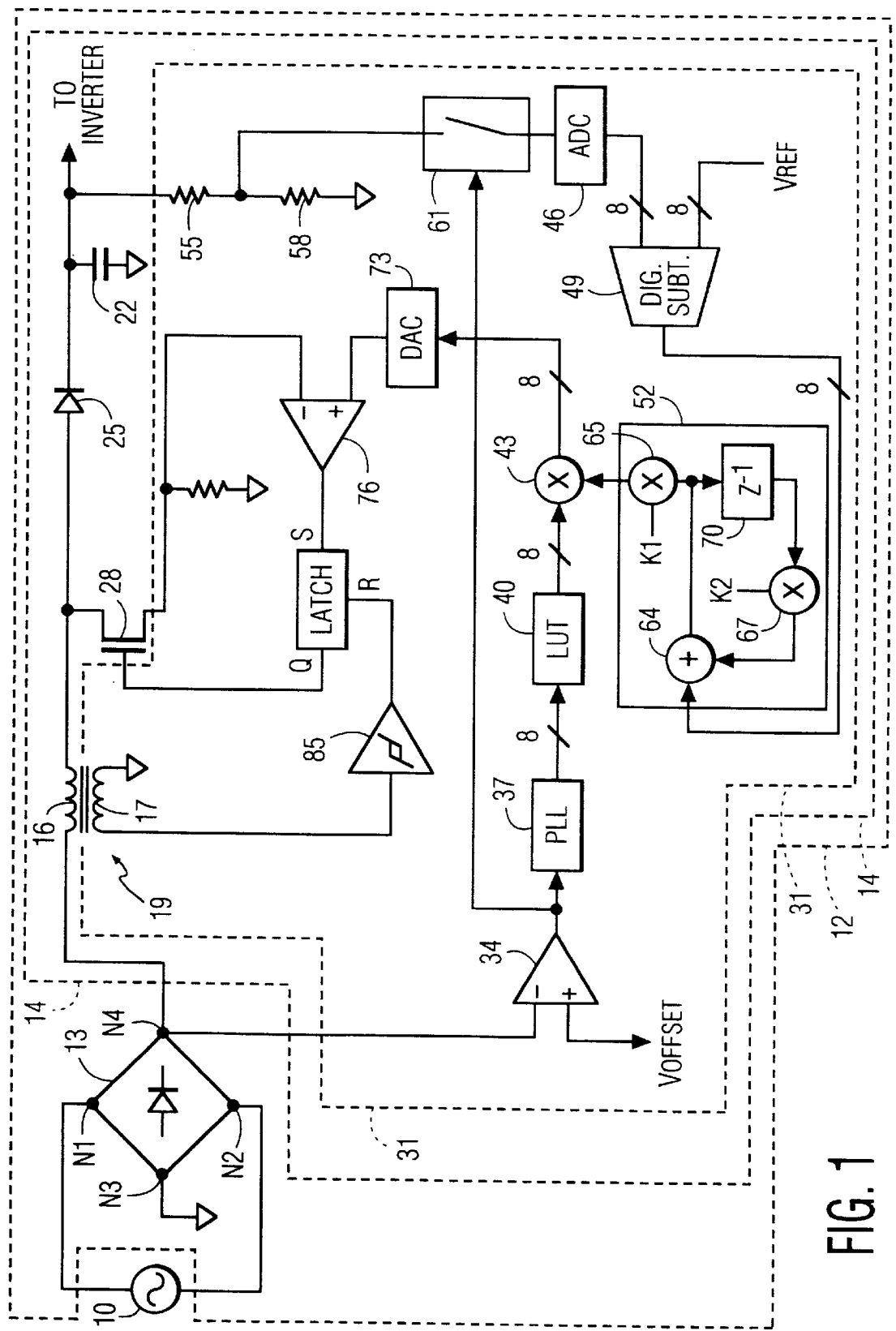
FIG. 1 is a partial block diagram and partial electrical schematic of a power factor controller in accordance with the invention.

As shown in FIG. 1, a mains sinusoidal AC voltage source 10 is connected to a ballast 12. Source 10 is connected to a pair of input nodes N1 and N2 of a full bridge rectifier 13 of ballast 12. A rectified sinusoidal voltage provided at a pair of output nodes N3 and N4 of rectifier 13 is applied to a preconditioner 14. The rectified sinusoidal voltage is transformed by preconditioner 14 into a substantially DC voltage with low ripple which is applied to an inverter (not shown) of ballast 12. In other words, preconditioner 14 serves as a boost regulator. Preconditioner 14 through a power factor controller 31 also controls the ballast input current in response to the ballast input voltage to maintain a high ballast power factor (e.g. over 95%) while maintaining a low TBD (e.g. less than 10%).

The rectified sinusoidal voltage produced by rectifier 13 is applied to a primary winding 16 of a transformer 19 of preconditioner 14. A capacitor 22, typically an electrolytic, stores the energy supplied by primary winding 16 based on the energy passed through a diode 25. A switch 28, generally a field effect transistor (FET), is connected to a junction joining primary winding 16 to diode 25. The amount of energy supplied to capacitor 22 is controlled by the switching state of switch 28. A substantially DC voltage is produced across capacitor 22 which is supplied to an inverter of ballast 12.

Power factor controller 31 determines both the shape of the mains input current and the phase of the mains input current relative to the mains input voltage by controlling when switch 28 is turned on and off. A reference waveform generator of power factor controller 31 includes a zero crossing detector 34, a digital phase locked loop (PLL) 37 and a lookup table (LUT) 40. Detector 34 compares the voltage at a noninverting input (+), connected to a DC offset (Voffset), to the voltage at an inverting input (−), connected to output node N4 of full bridge rectifier 13. When the voltage at the noninverting input (+) is equal to or greater than the voltage at the inverting input (−), the output voltage of detector 34 is at a high logic level. When the voltage at the noninverting input (+) is less than the voltage at the inverting input (−), the output voltage of detector 34 is at a low logic level. A voltage pulse will be produced by detector 34 whenever the voltage produced by fill bridge rectifier 13 is at about zero volts, that is, every half cycle of the rectified sinusoidal voltage. An 8-bit digital pulse signal having a first frequency N is supplied to PLL 37 and represents the sinusoidal voltage supplied by source 10 to ballast 12.

PLL 37 outputs a pulse signal Vp having a second frequency M times greater than first frequency N (i.e. M is a multiple of of N). Pulse signal Vp (i.e. a series of pulses forming a pulse train) is based on the zero crossings of the AC voltage produced by source 10 thereby substantially eliminating any phase displacement between the input ballast voltage and the signal for turning on switch 28. These zero voltage crossings are the substantially zero voltage conditions of the rectified AC signal produced across the output of rectifier 13. Signal Vp serves as a clock signal for reading digitized values of a sine wave stored within LUT 40. Each of the M digitized values is an 8 bit word which together represent the positive half cycle of a sine wave stored in LUT 40. In accordance with the invention, a microcontroller, such as a 80C51 microcontroller, can be used in which a read only memory (ROM) of the microcontroller stores the M digitized values representing the positive half cycle of a sine wave.

The 8 bit word outputted from LUT 40 is supplied to a multiplier 43 which multiplies the 8 bit word by a scaling factor. The scaling factor is determined by a scaling circuit which includes an analog to digital converter (ADC) 46, a digital subtractor 49 and a filter compensator 52. The scaling factor is based on the voltage across capacitor 22, that is, the output voltage of preconditioner 14. Through scaling of the digitized positive half cycle sine wave, power factor controller 31 serves to regulate the output voltage of preconditioner 14.

The output voltage of preconditioner 14 is sampled through a voltage divider formed from the serial combination of a pair of resistors 55 and 58 and connected between the junction connecting diode 25 to capacitor 22 and ground. The sampled voltage is applied to a switch 61 which is closed whenever the output of detector 34 is at a high logic level (i.e. during the zero voltage crossings of the bridge 13 output). ADC 46 converts the sampled voltage into an 8 bit digital signal which is inputted to digital subtractor 49. The digitized sampled voltage is subtracted from a reference voltage Vref and is used to minimize the difference therebetween. Reference voltage Vref represents the DC output voltage desired across the output of preconditioner 14.

The output of digital subtractor 49 serves as an error signal and is based on the difference between the sampled voltage representing the actual voltage and the desired voltage across the output of preconditioner 14. Filter compensator 52, which is a digital low pass filter receives the digital subtractor 49 output. An extra pole can be added by filter compensator 52 into the control system for more stable and reliable operation. Other embodiments can include, but are not limited to, multiple poles or pole and zero implementations. Filter compensator 52 includes an adder 64 whose output is supplied to a multiplier 65. The output of multiplier 65 serves as the scaling factor to multiplier 43. The output of adder 64 is also supplied to a feedback path formed by a mulitiplier 67 and a register 70. Register 70 serves as a unit delayer. A pair of coefficients K1 and K2 associated with multipliers 65 and 67, respectively, are programmable and based on the system load.

The scaled digital sine wave outputted by multiplier 43 is converted into an analog signal by a digital to analog converter (DAC) 73. The output of multiplier 43, now in analog form, serves as a reference current supplied to the noninverting input of a current sense comparator 76. The reference current is a sine wave current based on the series sine wave binary digital code stored in LUT 40 and is based on and adjusted by a scaling factor during each zero crossing of the input voltage applied to ballast 12 by AC source 10.

A sample of the current flowing through primary winding 16 is converted into a voltage by a resistor 79 and applied to the inverting input of current sense comparator 76. The sampled current flowing through primary winding 16 is compared to the reference current by comparator 76. An RS latch 82, which receives the output of comparator 76 at its S input, ensures that only a single pulse appears at a Q output of latch 82 for turning on (i.e. driving into conduction) switch 28. Latch 82 is reset when substantially zero current is flowing through primary winding 16. Such substantially zero current flow is detected through a secondary winding 17 of transformer 19 monitoring the flow of current through primary winding 16 and supplying same to a Schmitt trigger 85. A high logic level is outputted by Schmitt trigger 85 and supplied to the R input of latch 82 for resetting the latter whenever a substantially zero current level is detected flowing through primary winding 16.

Comparator 76 provides a switching sequence to switch 28 which forces the peak of the current flowing through primary winding 16 to be substantially equal to the reference current supplied by DAC 73. The size of LUT 40 depends on the resolution of the analog signal desired to be outputted by DAC 73 and the ratio between the second frequency M and the first frequency N associated with PLL 37. A high resolution produced by DAC 73 can synthesize a substantially perfect sinusoid waveform such that the THD of the input current drawn by ballast 12 can be significantly reduced.

As can now be readily appreciated, an improved preconditioner 14 having power factor controller 31 is unaffected by the temporary distortion of the mains voltage through storage of a sine wave within LUT 40. Power factor controller 14 maintains a relatively high power factor (e.g. greater than 95%) without use of a relatively large electrolytic capacitor in order to maintain a low THD.

It will thus be seen that the objects set forth above and those made apparent from the preceding description are efficiently attained and since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What we claim is:

1. An apparatus for energizing a load, comprising:
   an input terminal for connection to a nominal AC sinusoidal supply voltage,
   an output terminal for connection to an electric load,
   a capacitor coupled to said output terminal,
   a controlled switch coupled to said input terminal and to said capacitor for controlling the amount of energy stored in the capacitor in response to a switching signal,
   power factor control means for producing the switching signal and including means for producing a sinusoidal-based waveform independent of the supply voltage waveform, and
   means for supplying the switching signal to a control terminal of the controlled switch.

2. The energizing apparatus as claimed in claim 1 further comprising means for deriving a signal indicative of a zero current level of a current flowing to the capacitor, and wherein said switching signal is in part determined by said signal.

3. The energizing apparatus as claimed in claim 1 wherein said sinusoidal-based waveform represents a half cycle of a sine wave.

4. The energizing apparatus as claimed in claim 1 further comprising, means for synchronizing the switching operation of the controlled switch to said AC supply voltage.

5. The energizing apparatus as claimed in claim 1 wherein the switching signal producing means is arranged so that the switching signal is based, at least in part, on the sinusoidal-based waveform.

6. The energizing apparatus as claimed in claim 1 wherein the load comprises an electric discharge lamp, said apparatus further comprising a full wave rectifier coupled between the input terminal and the output terminal.

7. The energizing apparatus as claimed in claim 1 wherein the power factor control means includes means for storing the sinusoidal-based waveform as digital values representative of said waveform.

8. The energizing apparatus as claimed in claim 1 wherein the power factor control means further comprises means controlled at least in part by said sinusoidal-based waveform for deriving said switching signal.

9. The energizing apparatus as claimed in claim 1 further comprising a scaling circuit for adjusting the amplitude of the sinusoidal-based waveform as a function of an output voltage at the output terminal.

10. The energizing apparatus as claimed in claim 9 wherein the scaling circuit further comprises means for sampling an output voltage at the output terminal in synchronism with zero crossings of the AC supply voltage at said input terminal, and a multiplier responsive to the sinusoidal-based waveform and controlled by the sampled voltage.

11. An apparatus for energizing a load, comprising:
    an input terminal for connection to a nominal AC sinusoidal supply voltage,
    an output terminal for connection to an electric load,
    a capacitor coupled to said output terminal,
    a controlled switch coupled to said input terminal and to said capacitor for controlling the amount of energy stored in the capacitor,
    a reference waveform generator including means for storing a sinusoidal-based waveform that is independent of the supply voltage waveform,
    means controlled at least in part by said stored waveform for deriving a switching signal based thereon, and
    means for supplying the switching signal to a control terminal of the controlled switch so that the input current waveform to the apparatus is substantially independent of the waveform of the AC supply voltage.

12. The energizing apparatus as claimed in claim 11 wherein said sinusoidal-based waveform represents a half cycle of a sine wave.

13. The energizing apparatus as claimed in claim 11 further comprising means for synchronizing the switching operation of the controlled switch to said AC supply voltage.

14. The energizing apparatus as claimed in claim 11 wherein the switching signal controls the operation of the controlled switch so that the power factor of the apparatus is substantially independent of temporary distortion of the waveform of the AC supply voltage.

15. The energizing apparatus as claimed in claim 11 wherein the load comprises an electric discharge lamp.

16. The energizing apparatus as claimed in claim 11 wherein the means for storing the sinusoidal-based waveform stores said waveform as digital values representative of the waveform.

17. The energizing apparatus as claimed in claim 16 wherein the digital values representative of the sinusoidal-based waveform represent a half cycle of a sine wave.

\* \* \* \* \*